(12) United States Patent
Baraty

(10) Patent No.: US 7,711,651 B2
(45) Date of Patent: May 4, 2010

(54) MEDIA AND APPARATUS FOR CONTROLLING USAGE OF UTILITIES

(75) Inventor: Mohammad Reza Baraty, Vancouver (CA)

(73) Assignee: Smart Disaster Response Technologies, Inc., Newport Beach, CA (US)

( * ) Notice: Subject to any disclaimer, the term of this patent is extended or adjusted under 35 U.S.C. 154(b) by 1189 days.

(21) Appl. No.: 11/022,206

(22) Filed: Dec. 23, 2004

(65) Prior Publication Data

US 2005/0105703 A1    May 19, 2005

Related U.S. Application Data

(63) Continuation of application No. 09/764,490, filed on Jan. 17, 2001, now Pat. No. 6,842,706.

(51) Int. Cl.
*G06Q 20/00* (2006.01)

(52) U.S. Cl. .............. 705/63; 705/51; 705/59; 700/122; 700/292; 340/635; 340/638

(58) Field of Classification Search .......... 705/63, 705/50, 412
See application file for complete search history.

(56) References Cited

U.S. PATENT DOCUMENTS

| | | |
|---|---|---|
| 3,714,456 A | 1/1973 | Krohmer et al. |
| 4,414,994 A | 11/1983 | Hogan |
| 4,620,283 A | 10/1986 | Butt et al. |
| 4,833,461 A | 5/1989 | Yeager |
| 4,841,287 A | 6/1989 | Flig et al. |
| 5,240,024 A | 8/1993 | Moore et al. |
| 5,267,587 A | 12/1993 | Brown |
| 5,489,889 A | 2/1996 | Kambouris et al. |
| 5,568,825 A | 10/1996 | Faulk |
| 5,572,438 A | 11/1996 | Ehlers et al. |
| 5,601,108 A | 2/1997 | Perry |
| 5,689,233 A | 11/1997 | Kurisu et al. |
| 6,181,985 B1 | 1/2001 | O'Donnell et al. |

(Continued)

FOREIGN PATENT DOCUMENTS

CA    2 163 696    11/1995

(Continued)

OTHER PUBLICATIONS

U.S. Appl. No. 11/413,400, including its patent prosecution history, and the Office Action mailed on May 7, 2007, Mohammad Baraty.

(Continued)

*Primary Examiner*—Evans J Augustin
*Assistant Examiner*—Shahid Kamal
(74) *Attorney, Agent, or Firm*—Knobbe, Matens, Olson & Bear, LLP

(57) ABSTRACT

Media and apparatus for managing usage of utilities are disclosed. Generally, each involves receiving representation of utility service usage at a load, receiving and storing in a storage device a usage range representation comprising at least one expected value of utility input to the load and/or at least one expected value of output from the load, and producing a control signal for use by a utility service controller when usage is outside of usage range representation. Control signal is operable to cause the utility service controller to regulate or interrupt the supply of the utility service to the load.

16 Claims, 10 Drawing Sheets

U.S. PATENT DOCUMENTS

| | | |
|---|---|---|
| 6,216,956 B1 | 4/2001 | Ehlers et al. |
| 6,266,579 B1 | 7/2001 | Baraty |
| 6,289,453 B1 * | 9/2001 | Walker et al. ............... 713/175 |
| 6,323,774 B1 | 11/2001 | Mitchell |
| 6,380,949 B2 | 4/2002 | Thomas et al. |
| 6,457,038 B1 * | 9/2002 | Defosse ..................... 709/200 |
| 6,470,386 B1 * | 10/2002 | Combar et al. ............. 709/224 |
| 6,519,509 B1 | 2/2003 | Nierlich et al. |
| 6,529,883 B1 * | 3/2003 | Yee et al. ..................... 705/63 |
| 6,842,706 B1 | 1/2005 | Baraty |
| 6,904,411 B2 | 6/2005 | Hinkle |
| 6,961,666 B2 * | 11/2005 | Comas Romero et al. ..... 702/62 |
| 7,053,767 B2 * | 5/2006 | Petite et al. ................. 340/531 |
| 7,082,533 B2 * | 7/2006 | Wheeler et al. ............. 713/155 |
| 7,110,984 B1 * | 9/2006 | Spagna et al. ................ 705/57 |
| 7,171,374 B1 * | 1/2007 | Sheehan et al. ................ 705/8 |
| 7,171,451 B2 * | 1/2007 | Defosse ...................... 709/208 |
| 2002/0018545 A1 * | 2/2002 | Crichlow ............... 379/106.03 |
| 2003/0369918 | 2/2003 | Pintsov |
| 2003/0115150 A1 * | 6/2003 | Hamilton et al. ............. 705/64 |
| 2004/0015433 A1 | 1/2004 | Johnson et al. |
| 2004/0024483 A1 * | 2/2004 | Holcombe .................. 700/122 |
| 2005/0116836 A1 | 6/2005 | Perry et al. |
| 2005/0125243 A1 | 6/2005 | Villalobos |
| 2006/0129497 A1 | 6/2006 | Baraty |
| 2006/0129498 A1 | 6/2006 | Baraty |
| 2006/0259199 A1 | 11/2006 | Gjerde et al. |

FOREIGN PATENT DOCUMENTS

| | | |
|---|---|---|
| CA | 2163696 C | 5/1996 |
| EP | 0694859 A2 | 1/1996 |
| EP | 0714018 A2 | 5/1996 |
| WO | WO 93/20544 | 10/1993 |

OTHER PUBLICATIONS

Li Chunlin et al., "Pricing and resource allocation in computational grid with utility functions", p. 4-6 Apr. 2005, IEEE, International Information Technology: Coding and Computing, 2005, ITCC 2005, vol. 2, pp. 175-180.

* cited by examiner

| | | | | | | | | |
|---|---|---|---|---|---|---|---|---|
| $M_1$ | $M_2$ | $M_3$ | DERIVED MEASU-REMENT | $R_1$ | $R_2$ | $R_3$ | DERIVED USAGE RANGE | $S_1$ | $S_2$ | $S_3$ | C |

FIG. 4

| ELECTRIC MOTOR | GAS STOVE | GAS FIREPLACE | WATER FAUCET | GAS FURNACE | ... |
|---|---|---|---|---|---|
| 111 | 100 | 100 | 101 | 110 | ... |

METROPOLITAN UTILITY CO. 122

SITE ID: 123456  126

124 { NAME: BOB BOBALINA 128
ADDRESS: 123 RIVER ST., BETHESDA MD 20814  130
ACCOUNT NUMBER: 6543-21-0  132

BASIC CHARGES FOR CONSUMPTION OF: 120 GIGAJOULES  134

BETWEEN DATES: 1/1/01 - 2/2/01  136

138 { APPLIED RATES:
HIGHEST RATE: $1.00/GIGAJOULE
LOWEST RATE: $0.94/GIGAJOULE
AVERAGE RATE: $0.96/GIGAJOULE

140 { TOTAL FOR CONSUMPTION: $138.24
TAXES: $ 9.67
TOTAL PAYABLE: $147.91

DUE DATE: 3/3/01

MEDIA AND APPARATUS FOR CONTROLLING USAGE OF UTILITIES

CROSS REFERENCE TO RELATED APPLICATIONS

This is a continuation of U.S. patent application Ser. No. 09/764,490, filed Jan. 17, 2001, now U.S. Pat. No. 6,842,706 the entire contents of which is incorporated herein by reference.

BACKGROUND OF THE INVENTION

1. Field of Invention

This invention relates to apparatus, methods, media, and signals for managing utility usage, in particular for controlling excessive or non-optimized usage of a utility, controlling a supply of a utility service to a load, facilitating monitoring of subscriber usage of a utility service, and billing a subscriber for utility service usage.

2. Description of Related Art

With the increasing prospect of rising natural gas prices, energy shortages, and water shortages looming on the horizon, there is a need for smart management of utility service usage. As national and worldwide energy resources dwindle, there is an increasing need to manage the efficiency of energy and water use. Recent years have seen an increased prevalence of energy blackouts, brownouts, and water restrictions during certain times of the year in order to conserve available resources of energy and water. As we move into the twenty first century the conservation of energy and water will gain increasing importance, requiring careful management of utilities.

Many existing systems used to manage utilities do so for control in disaster or abnormal conditions. For example some systems involve shutting off the supply of utilities during an emergency, such as in an earthquake or in response to leak detection or a short circuit. These systems generally monitor for faults or leaks in the utility system and respond by turning off a circuit breaker or shutting off valves and evacuating gases and water in order to prevent further damage to a dwelling or building.

However, in these systems there is no monitoring of utility usage and there is no subsequent controlling of utility supply in response to measurements made while monitoring the utility usage. Underscoring that need is the increased advantage of minimizing utility usage costs for inefficient use of energy, and the added safety precautions the system would present when utilizing appliances which have not been optimized for energy usage. Moreover, monitoring the usage of utilities would also naturally facilitate the tracking of utility expenditures, and would provide an opportunity to incorporate monitoring and controlling utilities with a billing process to provide payment for utility usage.

What would be desirable therefore are methods and apparatus which manage usage of a utility service.

SUMMARY OF THE INVENTION

The present invention addresses the above needs by providing methods, apparatus, media, and signals for managing utility usage.

In accordance with one aspect of the invention there is provided a method of controlling usage of a utility including receiving a representation of a utility service usage at a load, receiving and storing a usage range representation, and producing a control signal for use by a utility service interrupter, when the usage is outside of the usage range representation. The control signal is operable to cause the utility service interrupter to interrupt a supply of the utility service to the load.

The method may include transmitting the control signal to the utility service interrupter, receiving user input specifying the usage range representation and/or receiving a message from a communications system and extracting the usage range representation from the message according to a network protocol.

The method may also include receiving a plurality of representations of the utility service usage representing the utility service usage at the load, and receiving and storing a plurality of usage range representations.

The method may also include producing a derived representation from the plurality of representations of the utility service usage and producing the control signal when the derived representation is outside of the usage range representation. The method may also include comparing the representations of the utility service usage with respective usage range representations and producing the control signal when a set of representations of the utility service usage is outside of a corresponding set of usage range representations.

The method may also include storing the representation of utility service usage, displaying the representation of utility service usage, storing an indication of whether or not the control signal is active, and displaying the indication.

The method may also include transmitting the representation of the utility service usage to a remote location.

In accordance with another aspect of the invention there is provided a computer readable medium for providing instruction codes executable by a programmable device, for directing the programmable device to receive a representation of a utility service usage at a load, receive and store a usage range representation, and produce a control signal for use by utility service interrupter, when the usage is outside of the usage range representation.

In accordance with another aspect of the invention, there is provided a computer data signal embodied in a carrier. The computer data signal includes code segments for directing a programmable device to receive a representation of utility service usage at a load, receive and store a usage range representation, and produce a control signal for use by a utility service interrupter, when the usage is outside of the usage range representation.

In accordance with another aspect of the invention there is provided an apparatus for controlling usage of a utility including a communications device operable to receive a representation of a utility service usage at a load and operable to receive a usage range representation, a data storage device operable to store the usage range representation, and a controller, in communication with the communications device and the data storage device. The controller is operable to produce a control signal for use by a utility service interrupter, when the usage is outside of the usage range representation. The control signal is operable to cause the utility service interrupter to interrupt the supply of the utility service to the load.

The controller may further include a control signal generator operable to produce the control signal, or a processor circuit incorporating the control signal generator.

The communications device may be operable to transmit the control signal to the utility service interrupter, to receive user input specifying the usage range representation, to receive a message from a communications system containing the usage range representation, to be extracted from the message by the processor circuit according to a network protocol.

The communications device may be operable to receive a plurality of representations of the utility service usage representing the utility service usage at the load, and operable to receive a plurality of usage range representations. The data storage device may be operable to store the plurality of usage range representations.

The processor circuit may be operable to produce a derived representation from the plurality of representations of the utility service usage, and operable to cause the control signal generator to produce the control signal when the derived representation is outside of the usage range representation. The processor circuit may also be operable to compare the representations of the utility service usage with respective usage range representations and may be operable to cause the control signal generator to produce the control signal when a set of representations of the utility service usage is outside of a corresponding set of usage range representations.

The data storage device may be operable to store the representation of utility service usage, or to store an indication of whether or not the control signal is active.

The apparatus may further include an annunciation device operable to display the representation of the utility service usage, and the processor circuit may be operable to direct the annunciation device to display the indication of whether or not the control signal is active.

The communications device may also be operable to transmit the representation of utility service usage to a remote location.

In accordance with another aspect of the invention there is provided a method of controlling a supply of a utility service to a load including receiving a control signal indicating that a usage of the utility service at the load is outside of a usage range representation, and interrupting the supply of the utility service to the load in response to the control signal. The control signal may be received at a communications device in communication with a utility service interrupter, and interrupting may include actuating a valve or a switch.

The method may also include producing a representation of the usage of the utility service by the load, for use by a controller operable to produce the control signal, and transmitting the representation to the controller.

The method may also include measuring the usage of the utility service by the load to produce a measurement value representing usage of the utility service by the load, and producing the representation from the measurement value.

In accordance with another aspect of the invention, there is provided a computer readable medium for providing instruction codes executable by a programmable device, for directing the programmable device to receive a control signal indicating that usage of the utility service at the load is outside of a usage range representation, and to interrupt the supply of the utility service to the load in response to the control signal.

In accordance with another aspect of the invention, there is provided a computer data signal embodied in a carrier wave, the signal including code segments for directing a programmable device to receive a control signal indicating that a usage of the utility service at the load is outside of a usage range representation, and to interrupt the supply of the utility service to the load in response to the control signal.

In accordance with another aspect of the invention there is provided an apparatus for controlling a supply of utility service to a load including a communications device operable to receive a control signal indicating that a usage of the utility service at the load is outside of a usage range representation, and a utility service interrupter, in communication with the communications device. The utility service interrupter is operable to interrupt a supply of utility service to the load in response to the control signal, and may be operable to actuate a valve or a switch.

The apparatus may also include a processor circuit operable to produce a representation of the usage of a utility service by the load, for use by a controller operable to produce the control signal. The communications device may be operable to transmit the representation to the controller.

The apparatus may also include a measurement device in communication with the processor circuit. The measurement device may be operable to measure the usage of the utility service by the load to produce a measurement value representing the usage of the utility service by the load, and the processor circuit may be operable to produce the representation from the measurement value.

In accordance with another aspect of the invention there is provided a method facilitating monitoring of subscriber usage of a utility service including producing a measurement of usage of the utility service at a subscriber location, and transmitting the measurement from the subscriber location to an entity for monitoring the subscriber usage of the utility service.

In accordance with another aspect of the invention there is provided a computer readable medium for providing instruction codes executable by a programmable device, for directing the programmable device to produce a measurement of usage of the utility service at a subscriber location, and transmit the measurement from the subscriber location to an entity for monitoring the subscriber usage of the utility service.

In accordance with another aspect of the invention, there is provided a computer data signal embodied in a carrier wave. The signal includes code segments for directing a programmable device to produce a measurement of usage of the utility service at a subscriber location, and transmit the measurement from the subscriber location to an entity for monitoring the subscriber usage of the utility service.

In accordance with another aspect of the invention, there is provided an apparatus for monitoring usage of a utility service by a subscriber including a utility service measurement device operable to produce a measurement of usage of the utility service at a subscriber location, and a transmitter, in communication with the utility service measurement device, operable to transmit the measurement from the subscriber location to an entity for monitoring the subscriber usage of the utility service.

In accordance with another aspect of the invention, there is provided a method of billing a subscriber for utility service usage including producing a measurement of usage of the utility service at a location, receiving rate information for the utility service, applying the rate information to the measurement to produce a billing value, and producing a billing signal representing a bill bearing the billing value, for use by an output device at a subscriber location for producing a bill at the subscriber location.

The method may also include causing the bill to be printed or displayed at the subscriber location in response to the billing signal, or produced at a location designated by the subscriber.

The method may also include receiving the rate information at the subscriber location, and applying the rate information at the subscriber location.

The method may also include requesting the rate information from a server, by establishing a communications connection to a remote server, and transmitting the measurement or a value derived from the measurement to a remote server. The method may also include transmitting utility service usage information to a server.

The method may also include producing and storing a plurality of measurements of usage of the utility service, measuring usage of a plurality of utility services, obtaining rate information for at least some of the utility services, applying the rate information to the at least some of the utility services to produce at least some billing values for the at least some utility services, and causing at least some bills to be produced, bearing the at least some billing values. The method may also include producing the billing signal in response to a request for the bill to be produced.

In accordance with another aspect of the invention there is provide a computer readable medium for providing instruction codes executable by a programmable device and a computer data signal including respective code segments embodied in a carrier wave. The computer readable medium provides instruction codes executable by a programmable device and the computer data signal contains respective code segments for directing a programmable device to produce a measurement of usage of the utility service at a location, to receive rate information from the utility service, to apply the rate information to the measurement to produce a billing value, and to produce a billing signal representing a bill bearing the billing value, for use by an output device at a subscriber location for producing a bill at the subscriber location.

In accordance with another aspect of the invention there is provided an apparatus for billing a subscriber for utility service usage including a utility service measurement device operable to measure the utility service usage at a location, a communications device operable to receive rate information for the utility service, a processor circuit, in communication with the communications device, and operable to apply the rate information to the measurement to produce billing value and to generate a billing signal representing a bill bearing the billing value, for use by an output device at a subscriber location for producing a bill at the subscriber location.

The apparatus may further include an annunciation device responsive to the billing signal for producing the bill bearing the billing value. The annunciation device may further include a printer to print the bill at the location or a printer at a remote location to print the bill at a remote location.

The communications device may further include a receiver operable to receive the rate information at the location. The processor circuit may be operable to apply the rate information at the location.

The communications device may be operable to establish communications with either a server or a remote server to request the rate information from the server or the remote server, and further may include a transmitter operable to transmit either the measurement or a value derived from the measurement to a remote server. The transmitter may be operable to transmit utility service usage information to a server.

The apparatus may further include a data storage device operable to store the measurement of utility service usage.

The apparatus may also include a plurality of utility service measurement devices operable to produce a plurality of measurements of the utility service usage.

The plurality of utility service measurement devices may be operable to measure usage of a plurality of utility services, and the communications device may be in communication with the plurality of the utility service measurements and operable to obtain rate information for at least some of the utility services.

The processor circuit may be operable to apply the rate information to the at least some of the utility service measurements to produce at least some billing values for the at least some utility services.

The annunciation device may be operable to cause at least some bills to be produced, bearing the at least some billing values and may be operable to produce the billing signal in response to a request for the bill to be produced.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention:

FIG. 4 is a tabular representation of a measurement/status record produced by a processor circuit executing the process shown in FIG. 3.

FIG. 6 is a tabular representation of a test record recording the status indicators for a plurality of measurement/status records shown in FIG. 4.

DETAILED DESCRIPTION

Figure 1:
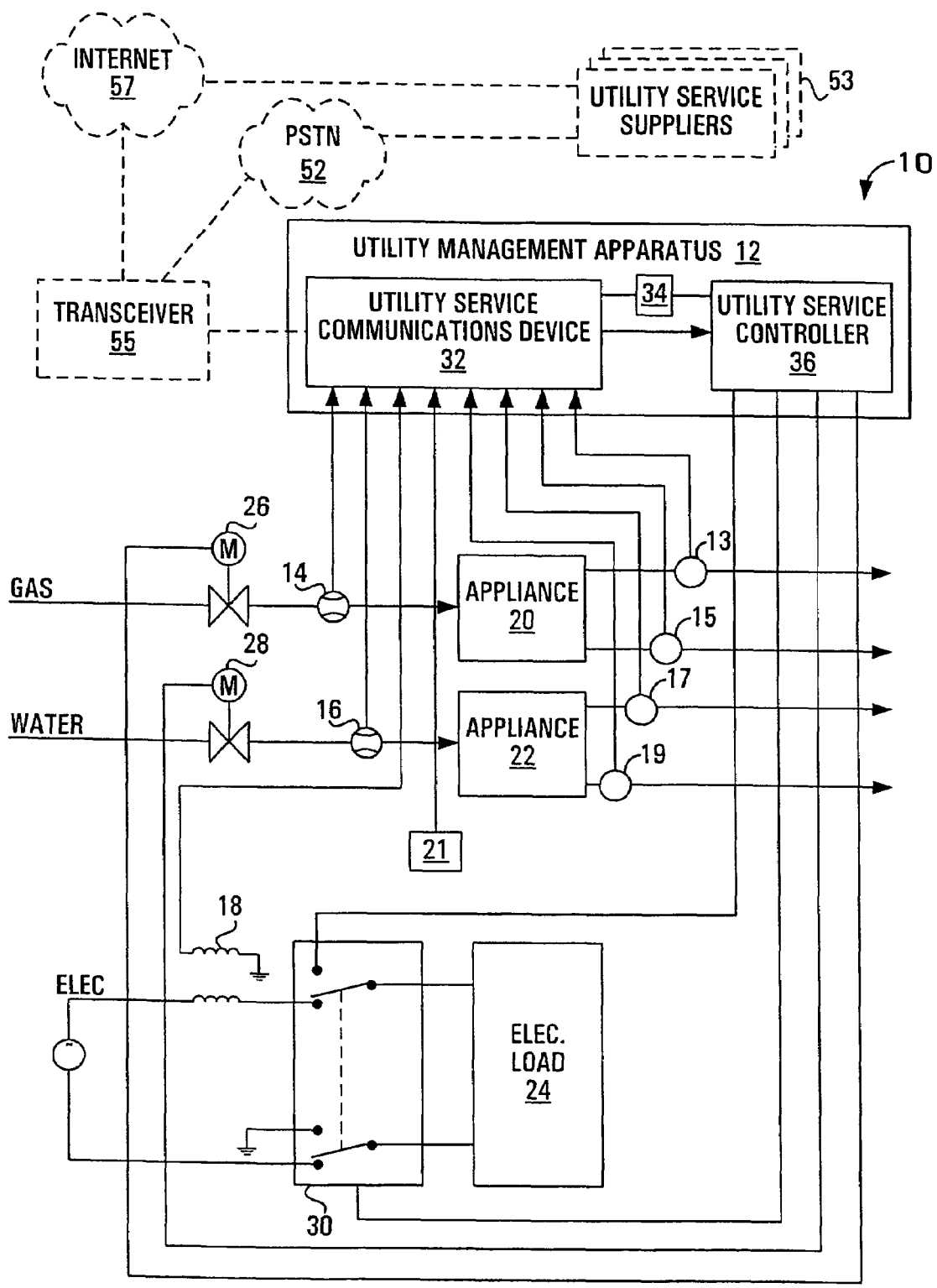
FIG. 1 is a schematic diagram of a system for managing utility usage according to a first embodiment of the invention.

Referring to FIG. 1 a system for managing utility usage, according to a first embodiment of the invention, is shown generally at 10. In this embodiment, the system includes a utility management apparatus 12, a plurality of measurement devices 13, 14, 15, 16, 17, 18, 19, and 21 and a plurality of control devices 26, 28, and 30.

The plurality of measurement devices 13, 14, 15, 16, 17, 18, 19, and 21 measure utility usage parameters, such as electrical power, water, and gas used by loads 20, 22, and 24, respectively, for example, and the control devices 26, 28, and 30 may be valves or relays, for example, for controlling the supply of utility services to the respective loads. The load may include appliances connected to a supply of gas, water, or electricity, for example, or other types of utilities.

The measurement devices 13, 14, 15, 16, 17, 18, 19, and 21 measure the usage of the utility service by their respective loads to produce a measurement value representing the usage of the utility service by the respective load. The measurement devices 14 and 16, for example, may be flow meters or flow switches to measure or sense the flow of gas and water to loads 20 and 22, respectively, and measurement devices 13, 15, 17, 19, and 21 may measure the amount of gas, water, heat, and/or other secondary by products exhausted from the respective loads. Alternatively, or in addition, measurement device 18 may be operable to measure the electric power consumed by respective electric load 24, and measurement device 21 may be operable to measure the continuity through the load to determine if the electric load is connected to a supply of utility service. In general, any other measurement devices able to determine the usage of a utility by a load may be used. Moreover, the measurement devices may comprise individual devices or any combination of measurement devices may be grouped together to determine an appropriate measurement of the usage of a utility service by a load.

The measurement value is a representation of the usage of the utility service by the respective loads or may be used to produce such a representation. The representation of utility service usage may be a signal representative of a measurement of flow of water or gas through an appliance, the amount of electric power or thermal energy used by an appliance, for example, or other types of measurements which can be used to determine the usage of a utility service. The representation of utility service usage may represent the usage of a single utility by an appliance, or may represent the usage of a plurality of utilities by various appliances.

The control devices 26, 28, and 30 are operable to interrupt a supply of utilities to their respective loads in response to respective control signals. A control signal may be a voltage signal in the 0-5V range, a current signal in the 4-20 mA range, or a computer data signal, for example. Generally, the control signal may be represented by a change in any feature of an electrical signal, for example.

The utility management apparatus 12 includes a communications device 32, a data storage device 34, and a utility service controller 36 in communication with the communications device and the data storage device. The utility management apparatus 12 receives, at the communications device 32, the representations of utility service usage at loads 20, 22, and 24, from the measurement devices 13, 14, 15, 16, 17, 18, 19, and 21, respectively.

The communications device 32 is also operable to receive a usage range representation, which serves as a range of values in determining whether there is excessive or non-optimized usage of a utility by a load, and stores the usage range representation in the data storage device 34. The data storage device—34 may store a single usage range representation pertaining to a single load, or may alternatively store a plurality of usage range representations for various loads. The utility service controller 36 compares the representation of utility service usage at a load to the corresponding usage range representation stored in the data storage device 34. If the utility service controller 36 determines that the usage of a utility by a particular load 24 is outside of the usage range representation for that load, the utility service controller produces a control signal for use by the control device 30 to interrupt the supply of the utility service to the respective load 24.

Management Apparatus

Figure 2:
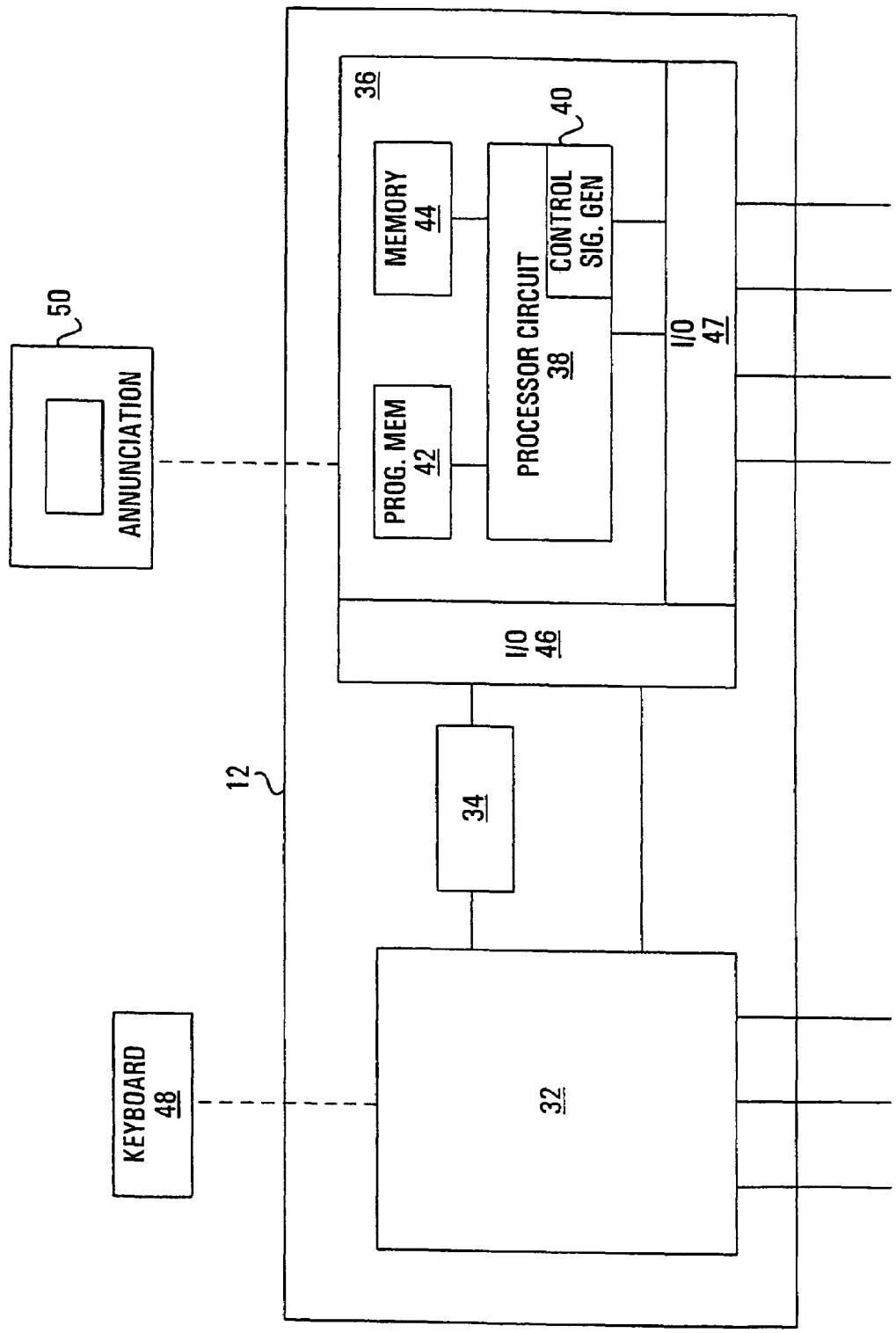
FIG. 2 is a block diagram of a utility management apparatus for controlling a supply of a utility service, as part of the system shown in FIG. 1.

Referring to FIG. 2, to achieve the above function, in this embodiment, the utility management apparatus 12 includes a processor circuit shown at 38 as part of the utility service controller 36. In this embodiment, the processor circuit 38 includes a control signal generator 40 for producing the control signal when the usage is outside of the usage range representation, for use by the control devices 26, 28, and 30 shown in FIG. 1, to interrupt a supply of the utility service to the respective loads. Alternatively, the control signal generator 40 may be separate from the processor circuit 38.

In this embodiment, the utility service controller 36 also includes a block of instruction codes provided by a processor readable medium accessible by the processor circuit 38. In this embodiment, the processor readable medium includes a program memory device 42 and a random access memory device 44. Alternatively, the processor readable medium may be a memory device such as a disc drive or CD-ROM, or EPROM, for example, but could alternatively be a communications link to the communications device 32 of the utility management apparatus 12, where the communications device is operable to communicate with a remote device. The communications link may include the internet, for example.

In the embodiment shown in FIGS. 1 and 2, the data storage device 34 is shown as a memory device separate from the utility service controller 36. Alternatively, the data storage device 34 may be incorporated in the program memory device 42, the random access memory device 44, or a CD-ROM, for example. Moreover, the data storage device 34 may be alternatively housed in the utility service controller 36, as shown in the embodiment in FIG. 1.

Referring to FIG. 2, the communications device 32 is operable to receive from the measurement devices 13, 14, 15, 16, 17, 18, 19, and 21 the representations of the utility service usage representing the utility service usage at respective loads 20, 22, and 24, and pass the representations to an input port 46 of the utility service controller 36 to be read by the processor circuit 38. Alternatively, the communications device 32 may store the representations of utility service usage at the data storage device 34, to be read by the processor circuit 38 of the utility service controller 36 as shown in FIG. 1.

Still referring to FIG. 1, the communications device 32 may also be operable to transmit the representation of utility service usage via a transmitter 55, such as a modem, for example, over a communications system to a remote location, such as a group of utility service suppliers 53 supplying the utility services or any other entity, for monitoring the usage of the utility service. The transmitter 55 is shown in FIG. 1 as separate from the utility management apparatus 12 and the communications device 32, but alternatively may be part of the communications device of the management apparatus. The communications system may include a computer network such as the internet 57 or may include a public switched telephone network (PSTN) 52, for example, or a private network or other communications system configured to deliver messages to contain the representation of the utility service usage.

The communications device 32 is also operable to receive input specifying the usage range representations of the respective loads. The usage range representation may be a signal derived by a processor in the communications device or other device, from input representing a maximum amount of power, voltage or current allowable to be used by a load 24, or a maximum amount of water or gas allowable to be used by loads 22 or 20, respectively. Alternatively, the usage range representation may represent an efficiency rating, a flow rating, a maximum and/or minimum utility service usage amount, a secondary by-product amount, or generally any other criteria which can be used to compare with the measured usage of a utility service by a load to determine if the usage by the load is excessive or not optimized to allow for maximum or efficient performance of an appliance connected to the load.

The input may be provided by a user from a keyboard 48, or may be provided in a message from a communications system, which may be the internet 57 or the PSTN 52, shown in FIG. 1. For example, a user managing the utility usage may want to specify the maximum amount of power to be used by a load for a certain time, or may want to change the maximum amount criteria to accommodate changes in the power demand due to holidays or extreme weather or general environmental conditions. Alternatively, the utility service suppliers 53 or other entity may set or change a maximum water usage criteria in response to drought conditions, or may set a total power consumption limit during times of high power demand, for example. Or, for example, the utility service suppliers 53 or other authorities may set different temperature limits for cooling or heating devices in different buildings.

Alternatively, certain appliances may be equipped with information message transmitting ability, such as ID chips, which can communicate information messages about expected power consumption, for example, to the communications device 32 to provide input specifying the usage range representation. Referring back to FIG. 2, the processor circuit 38 may be operable to extract the usage range representations from the messages and may store the usage range representations in the data storage device 34.

In the embodiment shown in FIG. 2, the utility service controller 36 is connected to an annunciation device 50, such as a monitor, television screen, speaker, or printer, for example, which is operable to annunciate by producing sound, printing, or displaying representations of the utility service usage by respective loads. Alternatively, signals produced by the utility service controller 36 for use by the annunciation device 50 may be transmitted to an annunciation device at a remote location, such as at the utility service suppliers 53 or at a location of an owner of a building using the utilities. This provides the user of the utilities, or the one responsible for the usage of the utilities, or the utility suppliers with real-time information relating to utility usage by individual loads or a plurality of loads.

Figure 3:
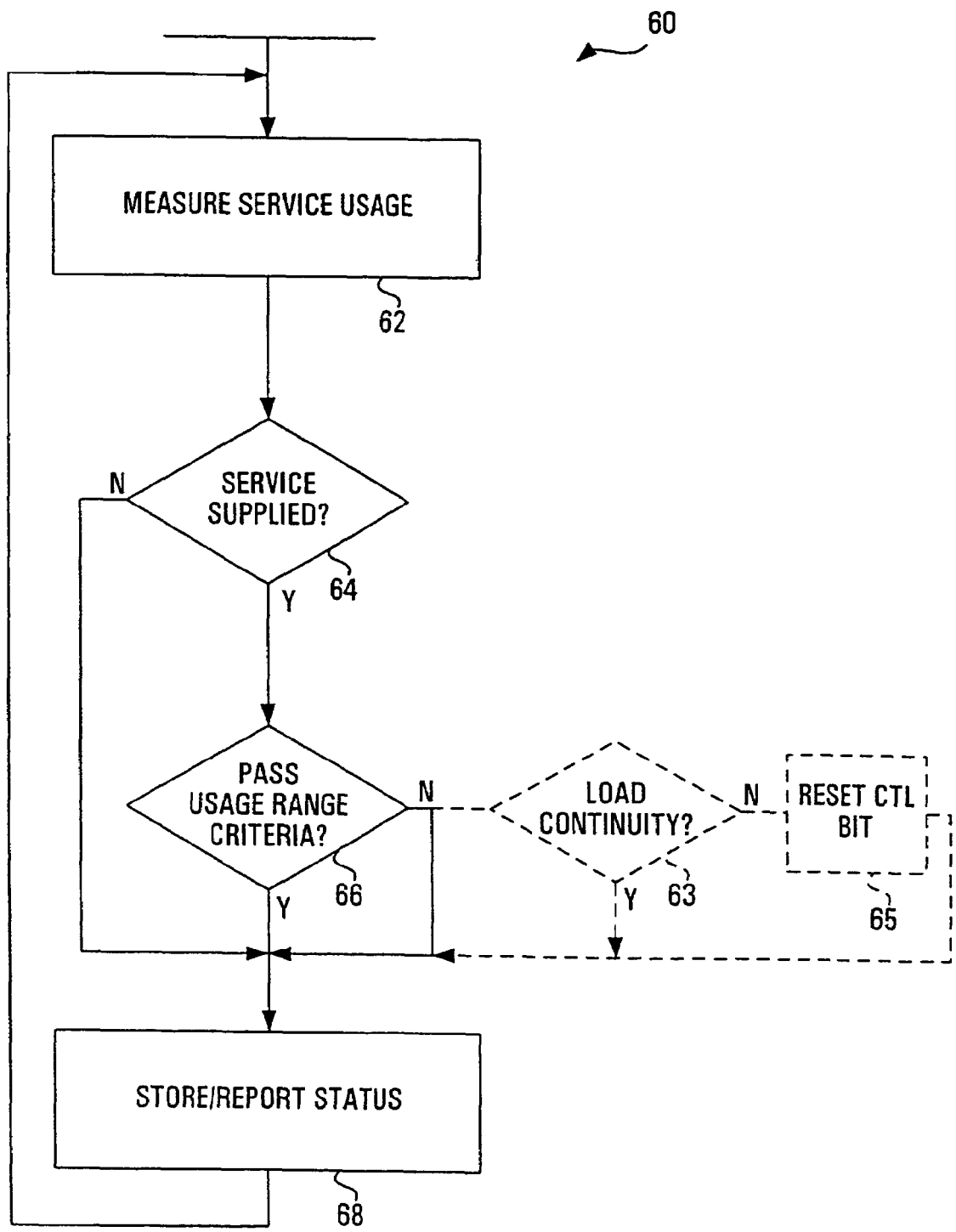
FIG. 3 is a flowchart depicting a process effected by a processor circuit of the utility management apparatus shown in FIG. 2.

FIG. 3 shows a flowchart 60 depicting a process effected by the block of instruction codes stored in the program memory device 42 which cooperates with the processor circuit 38 shown in FIG. 2, to function as the control signal generator 40.

Separate, similar processes are simultaneously executed by the processor circuit 38, for each load for which usage is monitored. The process is invoked periodically, such as every thirty seconds, to determine if there is an excessive or non-optimized usage of a utility by a load, and measurement of status records for each load are updated to hold current measurements and status of usage of the utility at the load.

Block 62 causes the processor circuit 38 to measure the flow of the utility to the load. To do this the processor circuit 38 may cause the communications device 32 to transmit a requesting signal to the measurement devices 13, 14, 15, 16, 17, 18, 19, or 21 shown in FIG. 1 to produce a measurement value. In response the measurement devices 13, 14, 15, 16, 17, 18, 19, and 21 produce a measurement value representing the usage of the utility service by respective loads, or the measurement value may be provided without the need for a requesting signal. The measurement value may represent the flow of water or gas through an appliance, the amount of electric power or thermal energy used by an appliance, for example, or other types of measurements which can be used to determine the usage of a utility service. For example, if load 20 is used by a gas fireplace device, the amount of usage of the gas utility by the load can be determined from measurement device 14, which measures the amount of flow of gas into the fireplace device. In addition, the measurement value may represent the amount of heat or carbon dioxide or any other secondary by-product produced by the fireplace device 20 as measured by measurement device 13. Alternatively, measurement devices 16 and 17 may measure the pressure or temperature of water in two separate sections of a pipe leading to a faucet 22, respectively, and the measurement value may be the difference in pressure or heat values to determine if the pipe has undesirable transmission capacity.

The measurement value obtained at the I/O port 46 of the processor circuit 38 is then stored at the data storage device in the corresponding measurement/status record, such as the disk drive 34 or memory device 44, for example. In addition to the measurement value, other information of relevance to the determination of utility usage may be stored. For example, additional information to be stored could include a start period of the measuring process, a time duration of the measuring process, the total consumption used by a load, and identification numbers corresponding to a specific appliance using the utility or specifying the utility supplier. The processor circuit 38 then receives the measurement value at an I/O port 46. The measurement value as measured by measurement device 14 or 16 may represent the flow of gas or water to loads 20 or 22, respectively.

Block 64 then causes the processor circuit 38 to determine whether the utility service is supplied to the load. To do this, the processor circuit 38 determines whether the measured flow is non-zero or exceeds minimum threshold criteria and if so the processor circuit determines that utility service is supplied to the respective load.

Further, the processor circuit 38 may be operable to produce a derived representation from a plurality of representations of the utility service usage. The derived representation may represent the efficiency of usage of a load derived from the utility service usage measurements, or may represent the consumption rate or exhaust rate of utility service usage by the load, for example. Alternatively, the derived representation may represent the efficiency of usage of the utility by the load, which, for example, may be determined by using measurement device 15 to measure the temperature change of a room heated by the fireplace device 20 to determine the heat produced, and then dividing the heat produced by the fireplace device by the thermal heat equivalent of gas delivered into the load. In addition, the derived rate may also represent the burning efficiency of gas as determined from measured carbon dioxide value or other secondary by-product value and the amount of gas supplied to the load 20, for example.

Referring back to FIG. 3, once the measurement value is obtained, block 66 directs the processor circuit 38 to compare the representations of the utility service usage with respective usage range representations. If a representation of the utility service usage is within the corresponding usage range representation, block 68 directs the processor circuit 38 to report the representation of utility service usage to the annunciation device 50, and/or to store the representation in the measurement/status record in the data storage device 34. In addition, a status indicator indicating that the utility service usage is within the corresponding usage range representation may be stored in the measurement/status record. The processor circuit 38 updates the status indicator information whenever block 66 has been entered and the representations have been compared. The processor circuit 38 may then direct the annunciation device 50 to display the updated status indicator. The process is then repeated by re-entering block 62 of the flowchart. In addition, the measurement value may also be displayed at the annunciation device 50. The processor circuit 38 may access other instruction codes stored in the program memory device 42 or other memory device 44, for example, to provide a graphical display at the annunciation device 50 to provide a user with a presentation of utility usage details, including the measurement values obtained.

If at block 66 it has been determined that a representation of the utility service usage is outside of a corresponding usage range representation, block 68 directs the processor circuit 38 to update the status indicator in the measurement/status record to indicate that the usage range has been exceeded and to store the usage representation and the status indicator and report the status indicator and the representation of utility service usage to the annunciation device 50. The processor circuit 38 is then directed back to block 62 and the process is repeated. Alternatively, at block 66 the processor circuit 38 may determine if a set or group of a plurality of representations of utility service usage is outside of a corresponding set of usage range representations, and if so, block 68 stores and reports the representation of utility service usage, and updates, stores, and reports the updated status indicator.

If at block 64 it is determined that the utility service is not being supplied to a load, the processor circuit 38 is immediately directed to block 68 to report to the annunciation device 50 and store in the measurement/status record an updated status indicator indicating that no utility service is being drawn from the load.

As stated above, separate similar processes are simultaneously executed by the processor circuit 38 for each load for which utility service usage is measured. Consequently, as a result of executing all of these processes, a plurality of measurement/status records corresponding to respective loads is continually updated to reflect the instantaneous current status of the supply of the utility service to the load.

Referring to FIG. 4, an example of a measurement/status record is shown generally at 200 and includes a plurality of measurement fields 202, usage range fields 204, status indicator fields 206, and a control signal field 208. The measurement fields 202 hold values representing measurements acquired from measurement devices 13, 14 and 15, respectively, for example, and may further include a field 203 for holding a derived value, such as energy consumption, computed from measured values. The usage range fields 204 hold values representing usage ranges for each measurement device 13, 14 and 15 and may include an additional field 205 or fields for derived representations representing energy usage ranges, for example.

The status indicator fields 206 include a primary field 144 indicating whether utility service is delivered to the load, a secondary field 146 indicating whether the usage of the utility is within the corresponding usage range representation, and a response field 148 indicating whether the supply of the utility service to the corresponding load may be interrupted. Each field may take a binary value, a range of integer values indicating, for example, a priority ranking of whether a particular load could be interrupted, or any number of bytes needed to represent the status indicator for a respective load.

In the embodiment shown in FIG. 4, the primary field 144 is 0(1) if the supply of utility service is not (is) delivered to the load, the secondary field 146 is 0(1) when the usage of the utility service is outside of (within) the usage range representation, and the response field 148 is 0(1) if the load may not (may) be interrupted. The response field 148 may be set by a user of the utility, or alternatively a utility service supplier 53, to make sure that certain loads, such as a furnace for heating or a stove for cooking, may not be interrupted regardless of whether or not the usage is outside of the usage range representation.

The control signal field 208 indicates whether or not a control signal, produced by utility service controller 36 shown in FIG. 1, is active. For example the control signal field 208 is 0(1) if a control signal is not (is) active to cause a control device 26, 28 or 30 to interrupt a supply of utility service to a corresponding load.

Figure 5:
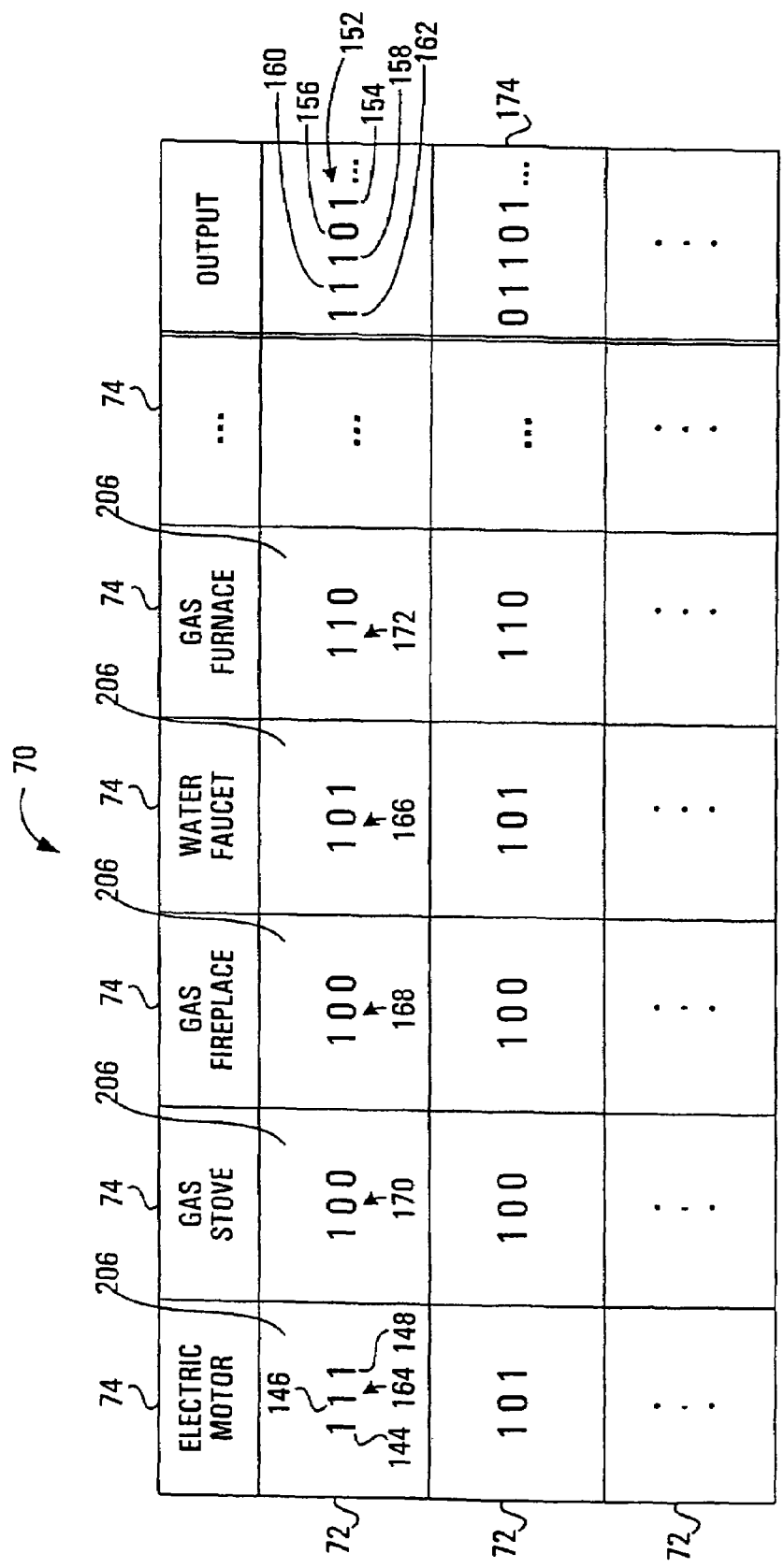
FIG. 5 is a tabular representation of a look-up table read by the processor circuit of the utility management apparatus shown in FIG. 2.

Once the updated measurement/status records resulting from the processes depicted at 60 in FIG. 3 are stored in the data storage device 34, the processor circuit 38 then employs the contents of the status indicator fields 206, in a look-up table shown generally at 70 in FIG. 5. In this embodiment, the look-up table 70 is stored in the data storage device 34. Alternatively, the look-up table 70 may be stored in the program memory device 42, the random access memory device 44, or other appropriate data storage device for example.

The look-up table 70 includes rows 72 indicating all possible combinations of status indicators 206 associated with respective loads. To use the look-up table 70 the processor circuit 38 produces a test record as shown generally at 220 in FIG. 6, by copying the status indicators 206 for each load into separate fields in a row.

For example, in FIG. 6 the test record 220 gives a representation of a particular combination of status indicators 206 for an electric motor load 164, a gas stove load 170, a gas fireplace load 168, a water faucet load 166 and a gas furnace load 172. For example, the status indicator 164 for the electric motor has a 1 from the primary field 144 indicating that the electric motor is using electricity supplied by an electric utility, a 1 from the secondary field 146 indicating that the usage of the electric utility is within the corresponding usage range representation, and a 1 from the response field 148 indicating that the load would be interruptible if the utility service usage were outside of the usage range representation. The status indicators 166-172 associated with the remaining loads include a set of values 166 representing the status of a faucet using water utility service. In this embodiment, the set has the value 101 and indicates that the faucet is using water outside of the usage range representation, and that the water service to the faucet may be interrupted. Similarly, sets of values 168 and 170 for the fireplace and the stove, respectively, which use the gas utility service are both 100, indicating that both the fireplace and the stove are using the gas utility service outside of the usage range representation, but the supply of gas is not to be interrupted to these appliances. In addition, a set of values 172 indicates that the gas furnace is using gas within the desired range representation and is not to be shut off.

In this embodiment each particular set of values has three status indicators resulting in eight combinations of status. It will be appreciated that more or less status indicators may be used without loss of generality.

To use the look-up table 70 shown in FIG. 5, the processor circuit 38 searches rows 72 thereof to find a configuration of status indicators 206 matching the configuration in the test record 220 shown in FIG. 6. Once a match is found, the processor circuit 38 locates a corresponding control value 152 which contains a sequence of control fields 154, 156, 158, 160, and 162, each of which comprises a binary value of 0 or 1 to indicate which, if any, supply of utility service to a corresponding load is to be interrupted. A 0 (1) in a control field indicates that the supply of utility service to the load should (should not) be interrupted. Alternatively, the control fields 154-162 may take on any other values indicating, for example, a priority order of which loads to interrupted, or any other labeling or numbering system readable by the processor circuit 38 to manage a plurality of utility services at respective loads.

In the embodiments shown in FIGS. 5 and 6, if the configuration of status indicators in the test record 220 is 111100100101110, for example, the corresponding control value 152 in the look-up table 70 sequence is 11101. The 1 in the electric motor control field 162, stove control field 160, fireplace control field 158, and furnace control field 154 indicate that the supply of corresponding utility services to those loads are not to be interrupted, while the 0 in the faucet control field 156 indicates that the supply of water to the faucet should be interrupted. As another example, if the configuration of status indicators in the test record is 101100100101110, the control value sequence is 01101, which indicates that the supply of utility service to the stove, fireplace, and furnace are not to be interrupted, while the supply of utility service to the electric motor and faucet is to be interrupted.

The processor circuit 38 causes the control signal generator 40 to produce control signals for use in interrupting the supply or continuing the supply of the utility services to respective loads, in response to the control value sequence which, as seen above, is produced in response to the representation of utility service at the load and the usage range representation.

Referring back to FIG. 2, once the processor circuit 38 has caused the control signal generator 40 to produce the control signals, the processor circuit directs the transmitter 47 to transmit the control signals to the control devices 26, 28, and/or 30 shown in FIG. 1 to interrupt the supply of the utility to the respective loads 20, 22, or 24. In addition, the control signal field 208 in the measurement/status record 200 shown in FIG. 4 is updated to 1 to indicate that the control signal is active. The communication device 32, or alternatively the processor circuit 38, reports at the annunciation device 50 that the control signal is active and the supply of service has been interrupted to the corresponding loads.

Control Devices

In general, each of the control devices includes a communications device and a utility service interrupter. The communications device is operable to receive a control signal and actuate the utility service interrupter to interrupt the supply of the utility service to the load in response to a control signal. The communications device may simply be a screw terminal on a motorized valve to directly use the control signal to actuate the valve, or may be a relay, transistor, microprocessor, computer, or any other device capable of receiving a control signal. The utility service interrupter may include a switch, a relay, a circuit breaker, a valve, a pneumatic device, a hydraulic device, and/or a motorized device, or generally any mechanism that prevents or restricts the passage of a utility service to a respective load.

Referring to FIG. 1, for electric loads such as load 24, the control device may be used to simply interrupt the supply of the utility to the load. However, since electrical loads can be replaced relatively easily, it is desirable to be able to restore electrical power to an electrical circuit when the load is changed. To do this, a special control device 30 is used and an enhancement to the flowchart 60 shown in FIG. 3 is made.

Figure 7:
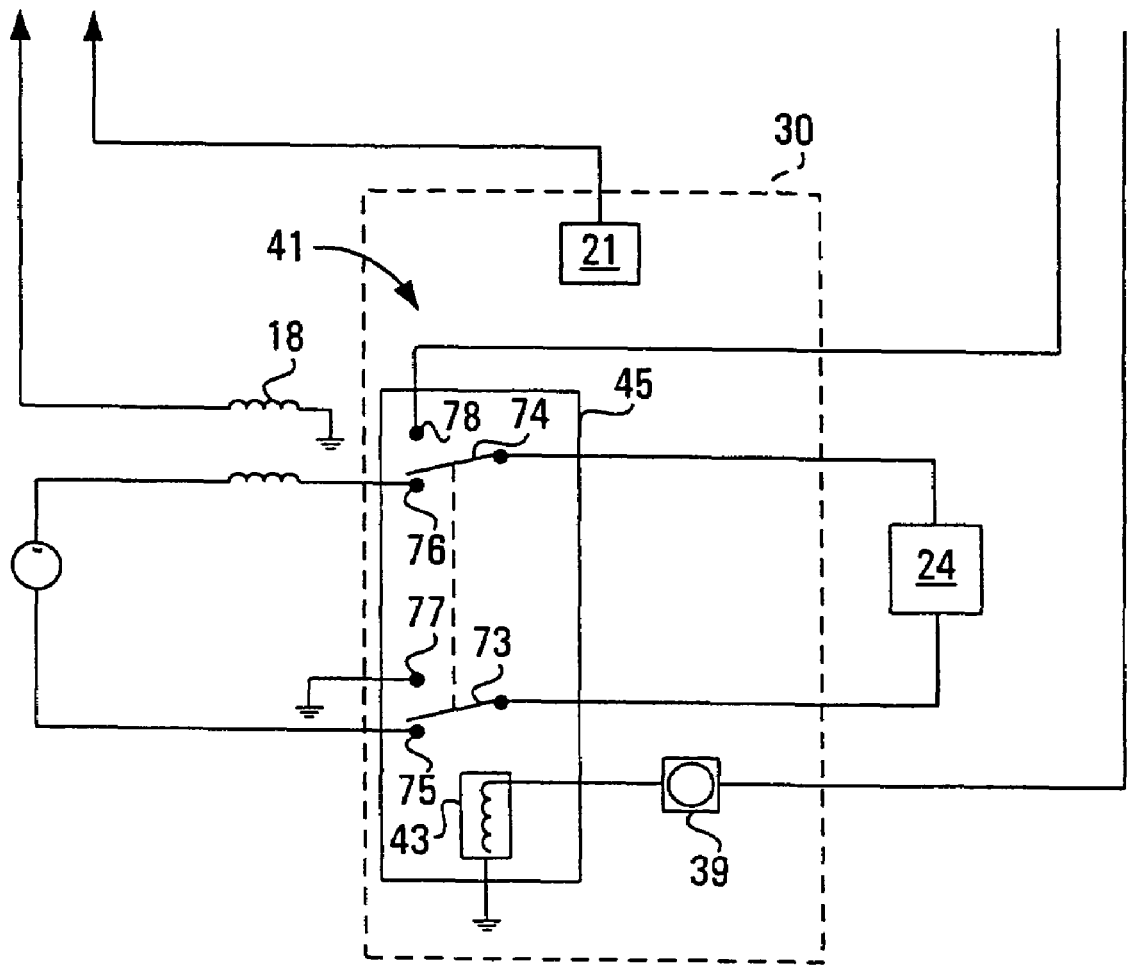
FIG. 7 is a schematic diagram of a control device of the system shown in FIG. 1.

Referring to FIG. 7, the special control device 30 employs a screw terminal as the communication device 39 and a relay 45 as the utility service interrupter 41. In this embodiment the relay 45 has a coil 43 which causes first and second wipers 73 and 74 to move in unison to connect the load 24 to supply contacts 75 and 76 or to sense contacts 77 and 78. In the normal, de-energized state, the load 24 is connected to the supply contacts 75 and 76. When the control signal is received at the coil 43, the load 24 is connected to the sense contacts 77 and 78, which completely isolates the load from the supply for safety, and permits the sense contacts to be used.

The enhancement to the flowchart 69 is shown in dotted lines in FIG. 3. This enhancement is only used for electrical loads 24 along with the control device 30 shown in FIG. 7.

The enhancement is invoked after block 66 of the flowchart 60 shown in FIG. 3, when it has been determined that the usage of an electric utility service by the electric load 24 is outside of the corresponding usage range, and a control signal has been sent by the control signal generator 40 to the control device 30 shown in FIG. 7. The control signal energizes the coil 43 to move the wipers 73 and 74 to cause the load 24 to be disconnected from the supply contacts 75 and 76 and connected to the sense contacts 77 and 78. The load 24 is thus isolated from the utility service supply.

Block 63 then directs the processor circuit 38 to perform a continuity test to test for continuity through the load 24 to detect when a user replaces the load. To do this, the processor circuit 38 directs the utility service controller 36 to send a DC sense signal through the load 24, using the sense contacts 77 and 78. The current through the load 24 is sensed by the measurement device 21 which provides a measurement value to the communications device 32 at the utility management apparatus 12 shown in FIG. 2. This measurement value is then stored in the measurement field 202 of the measurement/status record 200 shown in FIG. 4.

Referring to FIGS. 1, 2, and 4, the processor circuit 38 monitors the measurement field 202 whenever a 1 is stored in the corresponding control signal field 208 to determine whether or not there is a break in continuity. If the electric load 24 is removed from the circuit, then measurement device 21 measures no current and returns a zero value to the utility management apparatus 12, indicating a break in continuity. This would occur for example, when a user disconnects the defective or inefficient appliance responsible for using electric utility service outside of its usage range and wishes to replace it with a more efficient appliance.

Referring back to FIGS. 2, 3, 4, and 7, when the load 24 is removed from the circuit, block 65 directs the processor circuit 38 to cause the control signal generator 40 to cease sending the control signal to the control device 30, which de-energizes the coil 43 of the relay 45 to cause the load to be reconnected to the supply contacts 75 and 76 to receive power from the electric utility service. In addition, block 65 directs the processor circuit 38 to reset the control signal field 208 of the measurement/status record 200 to 0, and block 68 is then executed by the processor circuit to store and report the information provided during the process 60. Thus, when the user connects a new load, power from the electric utility supply is immediately available to the load. If the user reconnects the old load, the out-of-range condition will once again be detected and the supply of electric utility service will again be interrupted.

If at block 63 the processor circuit 38 determines that continuity is still established, that is, the offending load remains connected, then the control signal field 208 is unchanged and the coil 43 of the relay 45 remains energized, keeping the load 24 isolated from the utility service supply.

Figure 8:
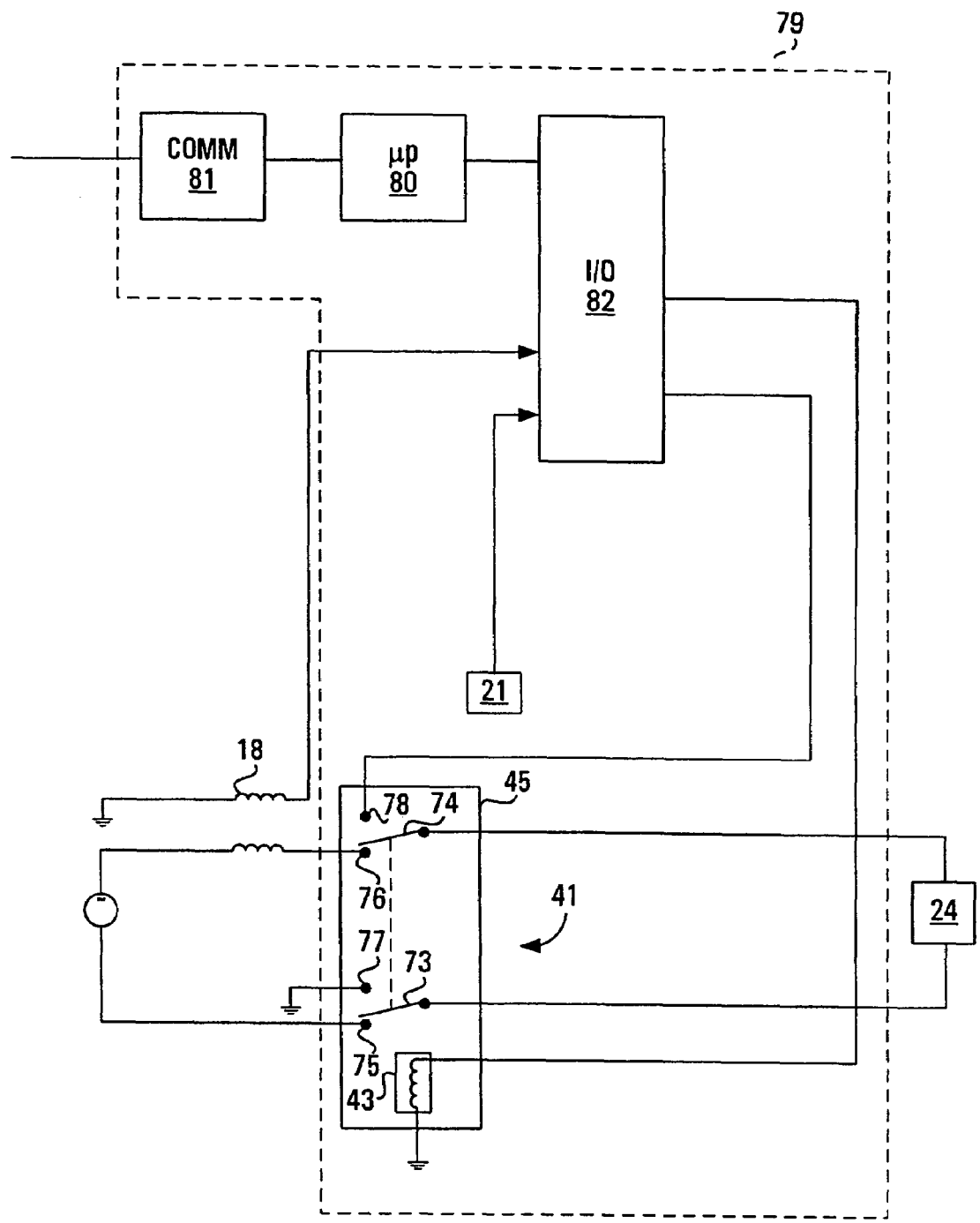
FIG. 8 is a schematic diagram of a control device, according to an alternate embodiment, of the system shown in FIG. 1.

Referring to FIG. 8, a control device 79, according to an alternative embodiment of the invention incorporates both measurement and control functions for electrical loads. In this embodiment the control device 79 includes a processor circuit 80, a communications device 81, an I/O device 82 and a utility service interrupter 41 which includes a relay 45 which functions as described in the embodiment shown in FIG. 7.

In this embodiment, the communications device 81 facilitates two-way communications between the processor circuit 80 and the utility management apparatus 12 shown in FIG. 1. The communications device 81 may form part of a Bluetooth® communications system, for example, or may simply be hardwired to the utility management apparatus 12. The communications device 81 may even be operable to communicate with the utility management apparatus 12 using the internet or a wireless communication device, for example. Communications between the processor circuit 80 and the utility management apparatus 12 may involve the utility management apparatus sending messages to the processor circuit, requesting a measurement from the measurement device 18 anchor continuity sensor 21, or requesting operation or status of the utility service interrupter 41, and the processor circuit may send a message back to the utility management apparatus with the representation of the measurement or status of the utility service interrupter.

The I/O device 82 is operable to receive signals from the measurement device 18 and a continuity sensor 21. In addition, the I/O device 82 is operable to provide the continuity sense signal to the load 24 through sense contacts 77 and 78 of the relay 45, and the coil 43 of the relay is controlled by a signal produced by the I/O device 82.

The processor circuit 80 is operable to communicate with the I/O device 82 to receive a measure of the usage of the utility service by the load 24, to produce a measurement value representing the usage of the utility service by the load. The measurement value is received from the measurement device 18, at the I/O device 82, and is passed to the processor circuit 80, which in turn produces a representation of the usage of the utility service by the load 24 from the measurement value. The processor circuit 80 then passes the representation to the communication device 81 for transmission back to the utility management apparatus 12, shown in FIG. 1.

The control device 79 is used in conjunction with the enhancement to the flowchart shown in FIG. 3, but instead of the utility service controller 36 sending a control signal directly to the control device, a message including the control signal is sent. This message is interpreted by the processor circuit 80 and, in response, the processor circuit causes the I/O device 82 to issue a signal to the relay 45 to energize the coil 43 to facilitate continuity sensing. The processor circuit 80 then executes a routine (not shown) which causes it to continuously or periodically transmit a continuity sense measurement to the utility management apparatus 12 for use in conjunction with the flowchart at the utility management apparatus.

In the embodiment shown in FIG. 1, the measurement devices 13, 14, 15, 16, 17, 18, 19, and 21 and the control devices 26, 28, and 30 are shown as individual measurement and control devices, but some may alternatively be coupled together and sold as a unit in a common housing. Similarly, the utility management apparatus 12 and the utility service controller 36 may be housed in a common housing, as in the embodiment shown in FIG. 1, or may be packaged and sold as separate units.

Billing

Figure 9:
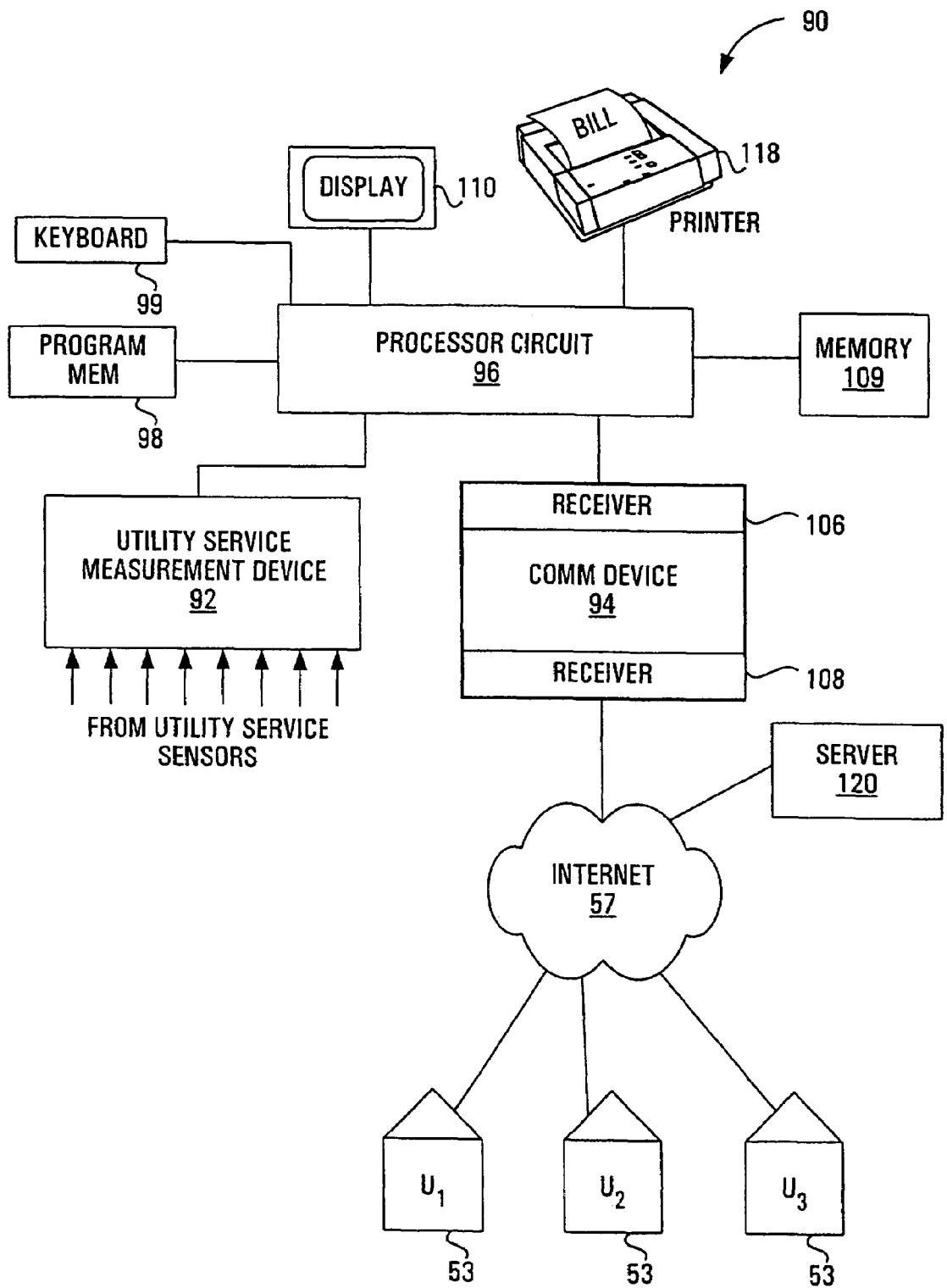
FIG. 9 is a schematic diagram of a billing system incorporating part of the system shown in FIG. 1.

In accordance with another aspect of the invention, there is provided a billing apparatus for billing a subscriber for utility service usage, shown generally at 90 in FIG. 9. The billing apparatus includes a utility service measurement device 92, a communications device 94, and a processor circuit 96.

The utility service measurement device 92 measures the utility service usage at a location where the utility service is being used. The utility service measurement device 92 may measure usage of a single utility or a plurality of utilities, and further may comprise a single measurement device or a plurality of measurement devices to produce a measurement or a plurality of measurements of utility usage. The utility service measurement devices may be any or all of the measurement devices 13, 14, 15, 16, 17, 18, 19, or 21 shown in FIG. 1, to measure the usage of gas, water or electricity, or any other utility, for example, or may include utility service inlet devices (not shown).

The communication device 94 is operable to receive rate information for the utility service used as measured by the utility service measurement device 92. Rate information may be provided by a user of the service at a user interface such as a keyboard 99 for example, or may be provided by utility service suppliers 53. The rate information may be transmitted via the internet 57, PSTN 52, a private network, or any other communications network connecting the rate provider with the communications device 94, to provide rate information. To do this, the communications device 94 may include a receiver 106 and a transmitter 108.

The processor circuit 96 is operable to apply the rate information received at the communications device 94 to the measurement produced by the utility service measurement device 92 to produce a billing value and to generate a billing signal representing a bill bearing the billing value. The billing signal may be used by an output device 110 or 118 at a subscriber location for producing the bill at the subscriber location, or may be transmitted to a remote location to generator a bill at a remote location.

To achieve this functionality, a block of instruction codes, stored in the program memory 98, is executed to start the billing process. The instruction codes may be provided from any computer readable medium, such as a CD-ROM, or downloaded over the internet 57 from a remote server 120, for example. A flowchart depicting the billing process provided by the block of instruction codes is shown generally at 100 in FIG. 10.

Figure 10:
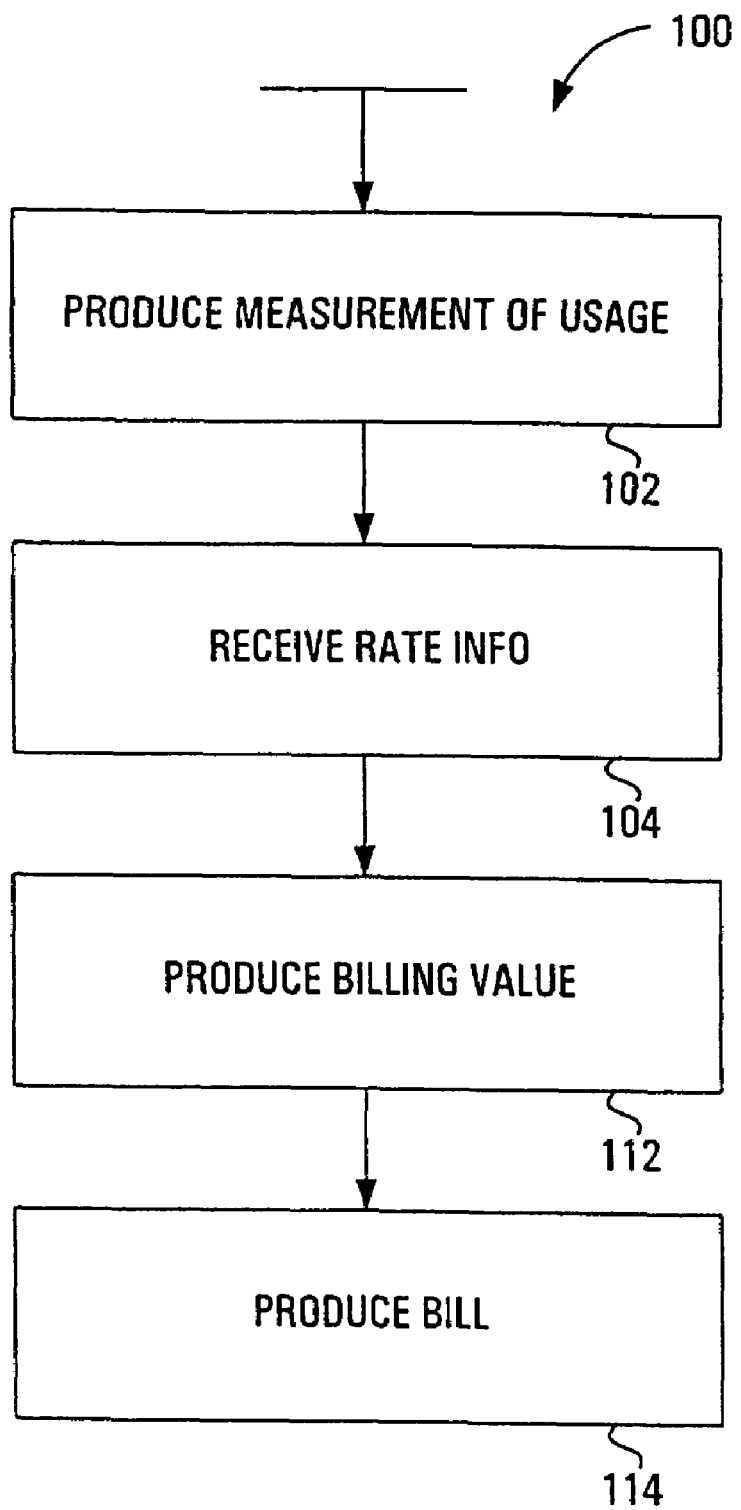
FIG. 10 is a flowchart depicting a process effected by a processor circuit of the billing system shown in FIG. 9.

Referring to FIGS. 9 and 10, the process is initiated at block 102, which directs the utility service measurement device 92 to receive a measure of utility service usage at a location. The measurement may be stored by the processor circuit 96 on a data storage device, which may include the program memory 98, a random access memory 109, or a disk drive, for example.

Block 104 then directs the communication device 94 to receive rate information from the rate provider. For example, the communications device 94 may establish communications with the server 120, and cause a rate request to be transmitted to the server. The server 120 may be a remote server, such as a server located at a utility service supplier for example, or may be located at a subscriber's location or any other location that provides the rate information to a subscriber of the utility.

The receiver 106 of the communications device 94 receives the requested rate information from the server 120 and once the rate information is received, block 112 directs the processor circuit 96 to produce the billing value from the measurement values and the rate information for the corresponding utility measured. The processor circuit 96 applies the rate information to the measurement of utility usage to produce the billing value. The billing value may represent costs for utility service usage of a single utility service or a plurality of utility services. The processor circuit 96 may produce the billing value, for example, by multiplying the kilowatt-hours of utility used by a rate per kilowatt-hour, or by multiplying the volume of water or gas used by an appropriate billing rate.

Block 114 then directs the processor circuit 96 to produce a billing signal from the billing value. The billing signal may contain the measurement value of usage of the utility service, a start time period for the measurement, a time duration period of the measurement, and/or identification numbers identifying the user and/or the supplier of the utility service, for example. The billing signal may be a voltage signal in the range of 0-10V, for example, or may be a message encoded in a TCP/IP protocol operable to be sent over a communications network such as the internet 57, for example, to a remote location. In this embodiment, the processor circuit 96 transmits the billing signal to an output device such as a monitor 110, a printer 118, or any other output device responsive to the billing signal for annunciating the billing value.

Figure 11:
FIG. 11 is a schematic diagram of a bill produced according to the process shown in FIG. 10, by the billing system shown in FIG. 9.

An example of a bill produced at the output device 110 or a printer 118 is shown generally at 121 in FIG. 11. In this embodiment, the bill 121 includes various portions identifying the details of utility usage. For example, a utility field 122 identifies the utility supplier, and a user display portion 124 identifies information pertaining to the user of the utilities. The user display portion 124 may contain a site field 126 identifying the location of utility usage, and name 128, address 130, and account number 132 fields of a subscriber of the utility service. A consumption field 134 may present the total usage amount of the utility used between dates specified in a duration period field 136. A rate area 138 may present a rate or a compendium of rates used to calculate the bill amount, and a charge area 140 may present charges for the utility service used. The charge area may list the amount due, due date, and gross charges for utilities used plus additional surcharges, such as tax or connection charges, for example. Other types of display formats may be used which present similar information in any appropriate display format. While specific embodiments of the invention have been described and illustrated such embodiments should be considered illustrative of the invention only and not as limiting the invention as construed in accordance with the accompanying claims.

What is claimed is:

1. An apparatus located at a consumer site for controlling usage of a utility by each one of a plurality of loads at the consumer site, the apparatus comprising:
    a plurality of different loads located at a consumer site;
    an ID chip that communicates information about each of the different loads, wherein each ID chip communicates for its load, a first usage range representation;
    a utility usage control device for each of the different loads that communicates with a computer system and controls the utility services used by each of the loads;
    at least one input measurement device for each of the different loads that communicates with the computer system and provides a measured input value of at least one utility supplied to each load;
    at least one output measurement device that communicates with the computer system and provides a measured output value of at least one product produced by each load;
    the computer system at the consumer site having at least one computer processor for accessing computer readable instructions and at least one data storage device for storing computer readable instructions;
    a communications device that communicates with the computer system at the consumer site, the utility usage control device of each load, at least one entity not located at the consumer site, and with the ID chip of each load;
    wherein the computer system, with respect to each load, stores a response value, wherein the response value indicates whether the utility service used by a load is interruptible;
    wherein the computer system, with respect to each load, receives from the ID chip the first usage range representation;
    wherein the computer system, with respect to each load, receives from a second source, a second usage range representation, wherein the second usage range representation is different than the first usage range representation for at least one time period;
    wherein the computer system, with respect to each load, generates a third usage range representation which comprises a third range of usage of the utility service by that load which falls within both of the first and second usage range representations; and
    wherein when the response value indicates that at least one utility service used by a load is interruptible, the computer system, generates a control signal for the load based on a comparison between the measured input value of the load, the measured output value of the product produced by the load, and the third usage range representation for the load, wherein the control signal directs the utility usage control device of the load to regulate the usage of the utility by the load.

2. The apparatus of claim 1, wherein the first usage range representation comprises values for the usage of the utility service by the load.

3. The apparatus of claim 2, wherein the first usage range representation comprises value for the output of the utility service to the load.

4. The apparatus of claim 3, wherein the output comprises the output of the load.

5. The apparatus of claim 1, wherein user input specifies said first usage range representation.

6. The apparatus of claim 3, wherein the produced output of a load comprises a by-product of the load.

7. The apparatus of claim 1, wherein said processor extracts said second usage range representation from a message according to a network protocol.

8. The apparatus of claim 1, wherein said processor receives a plurality of data representing utility service usage at said load, and receives a plurality of usage range representations.

9. The apparatus of claim 8, wherein said data storage device stores said plurality of usage range representations.

10. The apparatus of claim 8, wherein said processor produces a resultant representation from said plurality of representations of said utility service usage, and operable to cause said control signal generator to produce said control signal when said resultant representation is outside of said usage range representation.

11. The apparatus of claim 9, wherein said processor compares said utility service usage data with respective usage range representations and causes said control signal generator to produce said control signal when a set of data representing said utility service usage is outside of a corresponding set of usage range representations.

12. The apparatus of claim 1, wherein said data storage device stores said utility service usage.

13. The apparatus of claim 1, further comprising an annunciation device operable to display said representation of said utility service usage.

14. The apparatus of claim 13, wherein said data storage device stores an indication of whether or not said control signal is active.

15. The apparatus of claim 14, wherein said processor directs said annunciation device to display said indication.

16. The apparatus of claim 1, wherein said communications device communicates said representation of said utility service usage to a remote location.

* * * * *